Feb. 18, 1969  A. BOSCHI  3,427,935
EXPANSION JOINT FOR ROADS AND BRIDGES
Filed Sept. 13, 1966
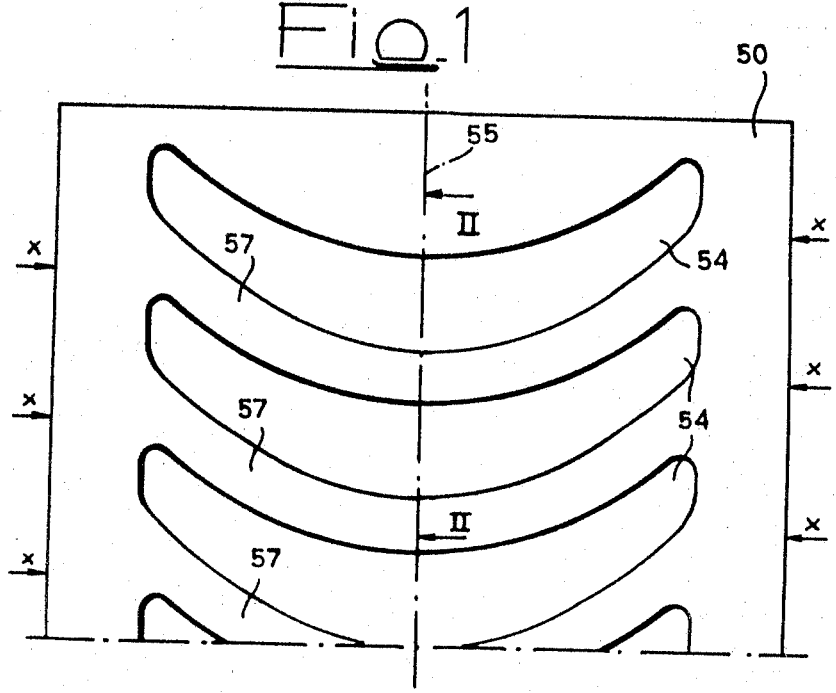
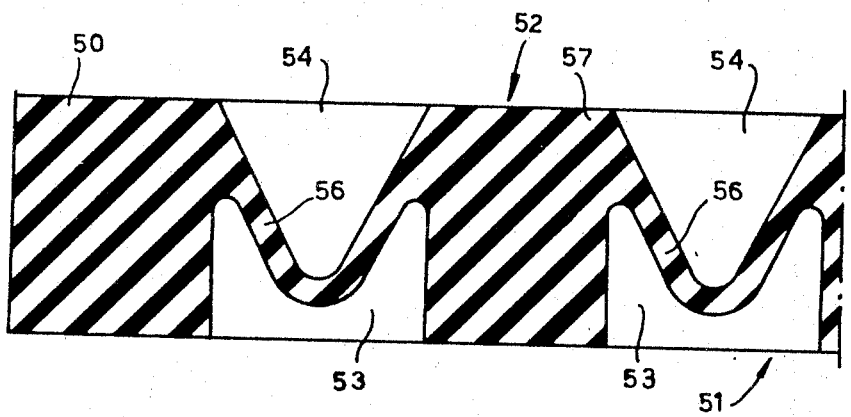

United States Patent Office 3,427,935
Patented Feb. 18, 1969

3,427,935
EXPANSION JOINT FOR ROADS AND BRIDGES
Antonio Boschi, Milan, Italy, assignor to Società Applicazioni Gomma Antivibranti "Saga" S.p.A., Milan, Italy
Filed Sept. 13, 1966, Ser. No. 579,056
Claims priority, application Italy, Sept. 27, 1965, 21,456/65
U.S. Cl. 94—18
Int. Cl. E01c 11/10
4 Claims

ABSTRACT OF THE DISCLOSURE

An expansion joint for roadways comprises a flat strip of rubber having in its opposite faces symmetrically arranged arcuate grooves extending transversely of the strip and terminating short of the side edges to leave ungrooved marginal portions. Grooves in opposite faces of the strip are approximately in register so as to define, between successive grooves, arcuate webs extending between the marginal portions at opposite sides of the strip. Successive webs are connected by diaphragms formed by the material between the bottoms of grooves in opposite faces.

---

The invention relates to rubber expansible joints for location between road bridge span elements or elements forming a road, which elements are liable to move as a result of expansion due to temperature changes. It has been proposed in French Patent 1,363,483 that such an expansible joint should include a flat rubber strip with two opposite faces formed with grooves therein inclined, for instance at about 45°, to the longitudinal axis of the road. In this way there exists, at each cross section of the joint, one or a plurality of thick ribs adapted to support the load of a vehicle driving thereover and one or a plurality of connecting diaphragms which afford the resilience necessary for absorption of the thermal movements of two adjacent road elements with respect to each other. The grooves are so dimensioned and arranged with respect to the thickness of the joint as to limit the tendency of the strip to rise above road level on expansion of the road elements.

However, it is found that with such an arrangement transverse components of the resilient forces are generated when the joint is compressed or stressed, and these components may give rise to difficulties.

An object of the present invention is to provide an expansible joint for use between road bridge span elements or elements forming a road surface subject to thermal movements, the joint being of the type referred to above, but one in which the grooves in the opposite strip faces are curved and are, in plan view, vaulted and symmetrical with respect to the longitudinal median axis of the strip. The terms "vaulted" and "arched" are used herein in their architectural sense to denote a groove which, in plan view, resembles a structural vault or arch.

In order that the invention may be more readily understood, reference will now be made to the accompanying drawing which are given by way of example and in which:

FIGURE 1 is a plan view of a portion of a rubber strip joint according to the invention; and FIGURE 2 is a sectional view taken along line II—II of FIGURE 1.

The joint according to the invention includes a flat strip 50 of rubber which is arranged over a gap between two road elements, the said gap being transverse with respect to the read longitudinal axis. In an assembled condition one face 51 of the strip faces downwardly and rests on the elements, and the other face 52 faces upwardly and is thus freely exposed. Dimensioning of the strip is such that the face 52 lies flush with the level of the upper surface of the road surface covering when the road elements are covered by suitable surfacing layers.

The faces 51, 52 of the strip 50 are provided with grooves 53, 54, respectively, the said grooves extending transversely with respect to the longitudinal axis of the strip. As will be seen from FIGURE 1, in plan view the grooves 54 are curved and are of a vaulted profile symmetrical with respect to the longitudinal median axis of the strip. This latter axis is indicated by the broken line 55 in FIGURE 1. In plan view the grooves 53 are of complementary shape to the grooves 54, and as may also be deduced from FIGURE 1, the grooves 53, 54 each increase in width from their ends towards the axis 55.

From FIGURE 2 it may be seen that each groove 53 in the lower face registers with a groove 54 in the top face. The grooves 53, 54, thus registered, are separated one from the other by remaining parts of the strip 50 which each constitute a rubber diaphragm 56. Each diaphragm 56 is of course smaller in thickness than the strip 50 and is substantially V-shaped in cross section. In practice the thickness of each diaphragm 56 preferably amounts to between ¼ and ½ of the strip thickness. As seen in FIGURE 2 the grooves 54 in the upper face of the strip are generally V-shaped in cross sections while the grooves 53 in the lower face of the strip are generally M-shaped.

Adjacent diaphragms 56 are separated by whole regions of the strip 50 which each constitute an arcuate element 57. The elements 57 are of course of the same thickness as the strip.

In use, a joint according to the invention operates as follows:

On a reduction in the size of a gap in the road joint as a result of expansion and elongation of the associated road elements, the associated strip 50 is stressed by compression forces acting in the road surface, these forces extending along the arrows X (FIG. 1). By virtue of the particular form of the arcuate elements 57, the latter tend to become deformed, their camber increasing without generating components transversely of the longitudinal axis of the road.

The deformation of the arcuated elements 57 occurs for the most part in the plane of the strip 50 on account of the fact that the rubber in the arcuate elements is capable of expanding in the grooves without being opposed by resistance of the diaphragms due to the flexibility inherent in the latter.

Various modifications of the invention are of course possible within the scope of the appended claims.

What I claim is:

1. An expansible joint for use between spaced elements of a vehicle bridge or road surface which elements are liable to move under the effect of temperature changes, said joint comprising a flat rubber strip having in opposite plane faces thereof a plurality of spaced grooves which extend generally transversely of the strip and terminate short of the opposite side edges of the strip, said grooves being arched in plan view and being symmetrical with respect to the longitudinal median axis of the strip with the opposite ends of each groove lying on a line perpendicular to the longitudinal axis of the strip, grooves in opposite faces of said strip being at least approximately in register with one another to define between successive grooves arcuate web elements extending between said marginal portions at opposite sides of said strip and connected with successive web elements by diaphragm portions between the bottoms of respective grooves in opposite faces of said strip.

2. An expansible joint according to claim 1, in which said web elements are of the same thickness as said marginal portions and the thickness of said diaphragm portions is between one fourth and one half of the thickness of said web elements.

3. An expansion joint according to claim 1, in which the width of each groove in plan view is greatest at the median longitudinal axis of the strip and decreases towards the opposite ends of the groove.

4. An expansion joint according to claim 1, in which the grooves in one face of the strip are generally V-shaped in cross section and the grooves in the opposite face of the strip are generally M-shaped in cross section, the material between the bottoms of corresponding grooves in opposite faces of the strip forming a diaphragm which is generally V-shaped in cross section.

References Cited
UNITED STATES PATENTS 3,218,941   11/1965   Daum _____ 94—18

FOREIGN PATENTS 1,363,483   5/1964   France.

JACOB L. NACKENOFF, *Primary Examiner.*